Nov. 12, 1929.　　　　　S. HATASHITA　　　　　1,734,969
TRAILER
Filed April 7, 1928　　　　2 Sheets-Sheet 1
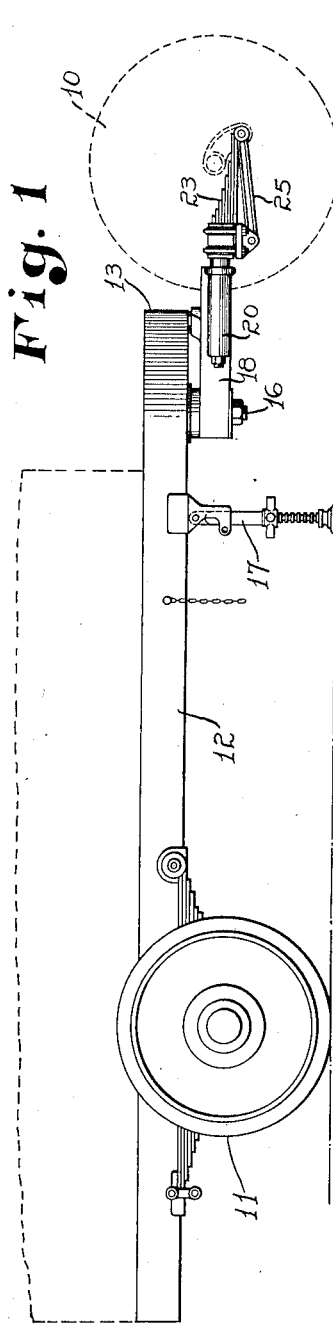
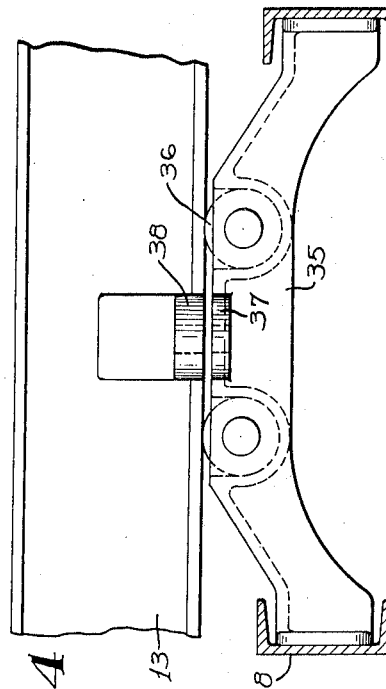
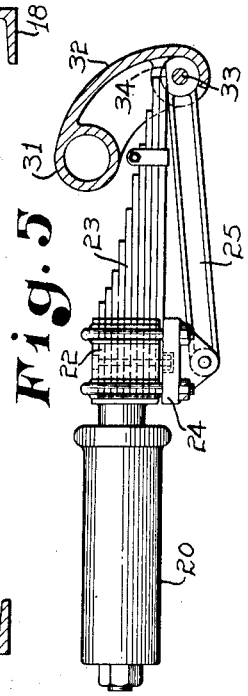
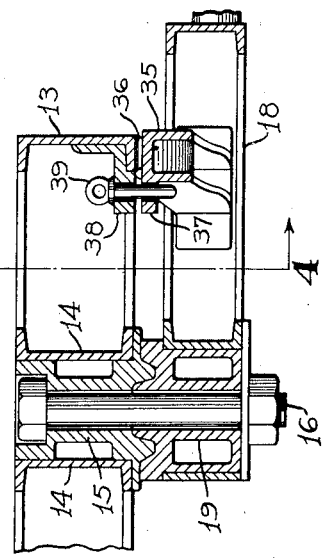
Inventor
Sezo Hatashita
By Owen & Owen
Attorneys

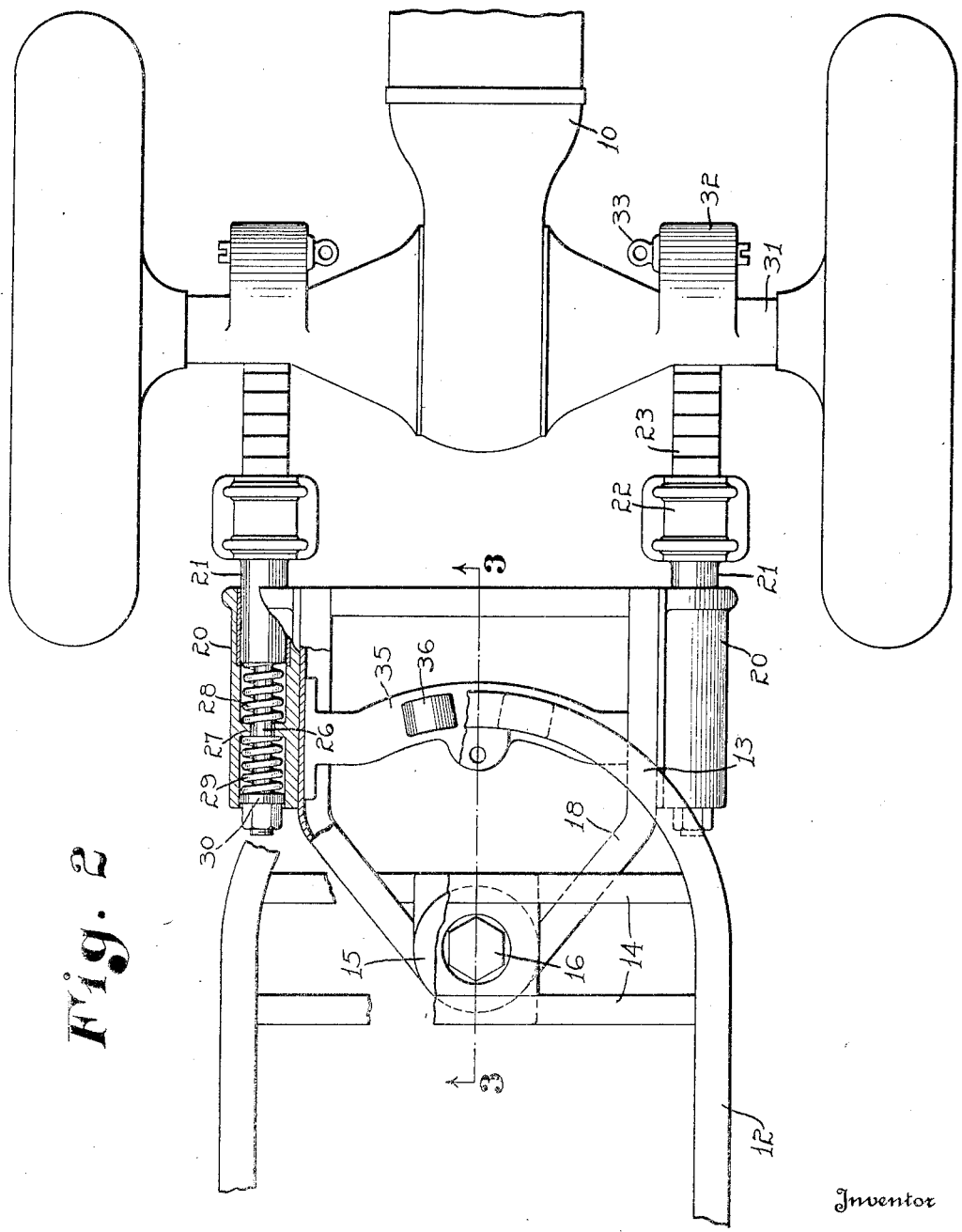

Patented Nov. 12, 1929

1,734,969

UNITED STATES PATENT OFFICE

SEZO HATASHITA, OF LIMA, OHIO

TRAILER

Application filed April 7, 1928. Serial No. 268,257.

This invention relates to a trailer, and particularly to means for connecting its front end to and supporting it from a tractor or similar vehicle.

One of the objects of the invention is to arrange the connections, for the purpose stated, in such a manner that there will be the least possible bending strain imposed thereon by the weight of the forward end of the trailer, at the same time permitting a free turning movement of the trailer about its king bolt.

Another object is to provide an improved coupling unit so arranged that the weight imposed by the trailer upon the rear end of the tractor and the rearward pull of the trailer, when connected to a tractor of the Fordson type, will not have any tendency to cause the tractor to buck or tip backwardly.

The coupling frame and the parts associated therewith are so constructed and arranged as to cushion the effects of the forces acting between the tractor and the trailer, thus further relieving the strains which have a tendency to bend or break the connections.

Provision is also made for locking the trailer against lateral turning movement when the trailer and tractor are backed.

The specific construction of the invention in its present embodiment, together with its mode of operation and the advantages resulting therefrom, will be more particularly explained in connection with the accompanying drawings, which illustrate the same in detail.

In the drawings,

Figure 1 is a side elevation of the trailer in the position which it assumes when attached to a tractor.

Fig. 2 is a plan view of the invention on an enlarged scale, parts being broken away or shown in section.

Fig. 3 is a vertical section taken on the line 3—3 of Fig. 2.

Fig. 4 is a vertical section taken on the line 4—4 of Fig. 3.

Fig. 5 is a side elevation of one of the connections between the coupling yoke and the axle housing of the tractor, the latter being shown in section.

Referring in detail to the drawings, the numeral 10 indicates the rear portion of a tractor, to which the trailer 11 is connected. The trailer has a chassis frame 12 which is semi-circular at its front end, as shown at 13. The front end of the chassis frame also has cross bars 14, between which is secured a bearing member 15 adapted to receive a king bolt 16. When the front end of the trailer is detached from the tractor, it is adapted to be supported by one or more jacks 17.

The coupling unit, by means of which the trailer is connected to the tractor with its front end supported thereby, includes a frame or yoke 18, at the rear end of which is secured a bearing member 19, complementary to the bearing member 15 and adapted to receive the king bolt 16. The arms of the yoke 18 extend forwardly and to each arm there is secured a sleeve 20, within which is mounted a shaft 21. This shaft is formed at its front end with a shackle 22 to which is secured a compound forwardly extending leaf spring 23. A connecting member 24 is mounted on the shackle 22 and has a draft bar 25 pivotally connected thereto.

The rear end of each shaft 21 has a reduced extension 26, which extends through an annular shoulder 27 formed on the inside of the sleeve 20. Shock absorbing springs 28 and 29 are carried by the extension 26 on opposite sides of the flange or shoulder 27. The spring 28 acts between the shoulder 27 and the main part of the shaft 21 to absorb any shock occasioned by backing the tractor, while the spring 29 acts between the shoulder 27 and a head 30 carried at the rear end of the extension 26 to take up the shock when the tractor moves forwardly.

In order to adapt the tractor for the purposes of the invention, the rear axle housing 31 has near each end thereof a forwardly and downwardly extending curved arm 32, the end of which is adapted to be connected to the corresponding draft bar 25 by means of a pin 33. The sides of the arm 32 are formed with flanges between which the forward end of the draft bar 25 is received, and the latter is formed with a seat 34 above the pin 33, for supporting the front end of the spring 23.

The arms of the yoke 18 are connected by a bar 35, a portion of which is arcuate and concentric with the king bolt 16. Anti-friction rollers 36 are mounted on this arcuate portion and are adapted to ride against the underside of the semi-circular end portion 13 of the chassis frame. This arcuate portion of the cross bar 35 is raised somewhat above the plane of the yoke 18 so that the chassis frame will be entirely clear of the coupling frame as the latter swings about the king bolt 16 as a center.

The cross bar 35 and the front end 13 of the chassis frame are provided centrally with rearwardly extending ears 37 and 38, respectively. These ears are provided with holes which are in registry when the tractor and trailer are in alinement and are adapted to receive a locking pin 39. This is for use particularly when the tractor is backed, in order to prevent the trailer from turning laterally.

From the foregoing description, it will be seen that the weight of the forward end of the trailer bears against the rollers 36 and there is no tendency for the king bolt 16 to be bent thereby. This weight which is taken up by the coupling yoke 18 is supported from the tractor through the medium of the springs 23, thus providing a resiliency which is quite important. The springs 28 and 29 provide a resiliency in a longitudinal direction between the tractor and trailer.

The end portions of the arms 32 which support the weight of the front end of the trailer and which also transmit the draft power thereto, are disposed below and in front of the tractor axle so that any power which is transmitted therethrough has a tendency to hold the front wheels of the tractor on the ground. This is an essential feature in connection with small tractors of the type described, since such tractors often buck or tip rearwardly when excessive resistance is encountered.

While I have shown and described in considerable detail the specific form of the invention which seems at present to be preferred, it is quite obvious that many modifications may be made therein, without any material departure from the scope of the invention as claimed.

What I claim is:

1. The combination of a trailer having a chassis frame with a king bolt depending therefrom, a coupling member attached to the king bolt and provided with means bearing against the underside of said chassis frame in front of the king bolt, towing means having a seat in supporting relation to the front end of said coupling member and draft means connecting said towing means to the coupling member independently of said seat.

2. The combination of a trailer having a chassis frame with a king bolt depending therefrom, a coupling member attached to the king bolt and provided with means bearing against the underside of said chassis frame in front of the king bolt, a towing unit having a rear axle housing with downwardly and forwardly projecting arms on which the coupling member has a floating support and draft means in addition to the floating support connecting the ends of said arms to the coupling member.

3. The combination of a trailer having a chassis frame, a coupling member swiveled to said frame and having means bearing against the underside of the frame in front of the swivel connection, means in supporting relation to the front end of the coupling member, and draft elements connecting said last mentioned means to the coupling member independently of its supporting relation thereto.

4. The combination of a trailer having a chassis frame, a coupling member swiveled to said frame and having means bearing against the underside of the frame in front of the swivel connection, a towing unit having a rear axle housing with downwardly and forwardly projecting arms, and draft elements connecting the ends of said arms to the coupling member, and means for supporting the forward end of said coupling member from the rear axle housing independently of the draft connections.

5. The combination of a trailer having a chassis frame, a coupling member swiveled to said frame and having means bearing against the underside of the frame in front of the swivel connection, a towing unit, draft elements connecting the towing unit to the coupling member and forwardly extending leaf springs secured to the coupling member and having their forward ends supported by the towing unit independently of the draft connections.

6. The combination of a trailer having a forwardly extending frame, a coupling frame connected therewith, shafts connected to the coupling frame and projecting forwardly, a towing unit, draft elements connecting the towing unit to said shafts, and leaf springs shackled to said shafts and having free ends projecting forwardly and supported from said towing unit independently of the draft connections.

7. The combination of a trailer, a coupling member connected with and supporting the forward end thereof, a towing unit having a rear axle housing with arms extending forwardly and downwardly, draft elements connecting the ends of said arms with the coupling member and formed with seats above the ends of said arms, and means for resiliently supporting the forward end of the coupling member on said seats.

8. The combination of a trailer, a coupling frame connected with and supporting the forward end thereof, a towing unit having a rear axle housing with arms extending forwardly and downwardly, extensions mounted on the coupling frame and projecting forwardly, draft elements connecting said extension with the ends of said arms, said draft elements being formed with seats above the ends of said arms, and springs shackled to said extensions and resting on said seats to resiliently support the coupling frame and the front end of the trailer.

9. The combination of a trailer, a coupling member connected with and supporting the forward end thereof, a towing unit having a rear axle housing with arms extending forwardly and downwardly, draft elements connected to said towing unit, means connecting said draft elements to the coupling member, said last mentioned means being yieldable horizontally to absorb shocks in starting, seats located above the ends of said arms, and springs connected with said coupling member and resting on said seats to support the coupling member and the front end of the trailer.

10. The combination of a trailer having a forwardly extending frame, a coupling member in supporting relation to the forward end of said frame and having a swivel connection therewith, permitting a relative swinging movement in a horizontal plane, said coupling member having forwardly extending arms, a towing unit, and draft links connecting the towing unit with the respective arms of the coupling member, said arms having forward extensions resting on the draft links above the connections of the latter with the towing unit and supported thereby.

11. The combination of a trailer having a forwardly extending frame, a coupling member in supporting relation to the forward end of said frame and having a swivel connection therewith permitting a relative swinging movement in a horizontal plane, said coupling member having forwardly extending arms, a towing unit having a rear axle housing with forwardly and downwardly extending arms, draft links connecting said last mentioned arms with the respective arms of the coupling member, and forward extensions secured to the arms of the coupling member, and resting on the draft links above the connections of the latter with the axle arms, for supporting the coupling member and the forward end of the trailer frame.

In testimony whereof, I have hereunto signed my name to this specification.

SEZO HATASHITA.